(12) United States Patent
Kim et al.

(10) Patent No.: US 11,076,087 B2
(45) Date of Patent: Jul. 27, 2021

(54) METHOD FOR PROCESSING IMAGE BASED ON SCENE RECOGNITION OF IMAGE AND ELECTRONIC DEVICE THEREFOR

(71) Applicant: Samsung Electronics Co., Ltd., Gyeonggi-do (KR)

(72) Inventors: Moojung Kim, Gyeonggi-do (KR); Jungchan Cho, Gyeonggi-do (KR); Changhoon Kang, Gyeonggi-do (KR); Daehee Kim, Gyeonggi-do (KR); Youngil Shin, Gyeonggi-do (KR); Seonghun Cho, Gyeonggi-do (KR); Kyungjae Lee, Gyeonggi-do (KR); Seoyoung Lee, Gyeonggi-do (KR); Byounggeun Choi, Gyeonggi-do (KR); Jiyoon Park, Gyeonggi-do (KR)

(73) Assignee: Samsung Electronics Co., Ltd.

(*) Notice: Subject to any disclaimer, the term of this patent is extended or adjusted under 35 U.S.C. 154(b) by 0 days.

(21) Appl. No.: 16/533,197

(22) Filed: Aug. 6, 2019

(65) Prior Publication Data

US 2020/0053276 A1 Feb. 13, 2020

(30) Foreign Application Priority Data

Aug. 8, 2018 (KR) .......................... 10-2018-0092707

(51) Int. Cl.
*H04N 5/232* (2006.01)
*G06K 9/32* (2006.01)
(Continued)

(52) U.S. Cl.
CPC ..... *H04N 5/23218* (2018.08); *G06K 9/00664* (2013.01); *G06K 9/3233* (2013.01);
(Continued)

(58) Field of Classification Search
CPC .................... H04N 5/23218; G06K 9/00664
(Continued)

(56) References Cited

U.S. PATENT DOCUMENTS

| 7,379,613 B2 | 5/2008 | Dowski, Jr. et al. |
| 7,889,269 B2 | 2/2011 | Okamoto |

(Continued)

FOREIGN PATENT DOCUMENTS

| EP | 3579147 A1 * 12/2019 ......... G06K 9/00664 |
| JP | 2008-187524     8/2008 |

(Continued)

OTHER PUBLICATIONS

International Search Report dated Nov. 28, 2019 issued in counterpart application No. PCT/KR2019/009516, 3 pages.

*Primary Examiner* — Anthony J Daniels
(74) *Attorney, Agent, or Firm* — The Farrell Law Firm, P.C.

(57) ABSTRACT

An electronic device and a method for setting image quality are provided. An electronic device includes a camera, a memory, and a processor configured to obtain, using the camera, a plurality of images for one or more external objects, identify a region of interest and a background region using one or more images of the plurality of images, recognize a first object included in the region of the interest, identify a type of the background region by recognizing a second object included in the background region, determine a scene corresponding to the one or more images, based on the recognized first object and the identified type of the background region, and adjust at least one of an image quality setting associated with the camera or an image quality setting associated with the one or more images using a specified image quality setting corresponding to the determined scene.

19 Claims, 15 Drawing Sheets

(51) Int. Cl.
*G06K 9/62* (2006.01)
*G06K 9/00* (2006.01)

(52) U.S. Cl.
CPC ......... *G06K 9/6215* (2013.01); *G06K 9/6262* (2013.01); *H04N 5/232935* (2018.08)

(58) Field of Classification Search
USPC ..................................................... 348/222.1
See application file for complete search history.

(56) References Cited

U.S. PATENT DOCUMENTS

| | | | |
|---|---|---|---|
| 7,911,501 B2 | 3/2011 | Johnson et al. | |
| 7,995,853 B2 | 8/2011 | Dowski, Jr. et al. | |
| 8,068,163 B2 | 11/2011 | Johnson et al. | |
| 8,111,937 B2 | 2/2012 | Dowski, Jr. et al. | |
| 8,514,303 B2 | 8/2013 | Wach | |
| 8,687,126 B2 | 4/2014 | Lee | |
| 8,717,456 B2 | 5/2014 | Johnson et al. | |
| 9,426,359 B2 | 8/2016 | Lee | |
| 2008/0044103 A1 | 2/2008 | Dowski, Jr. et al. | |
| 2008/0180543 A1 | 7/2008 | Okamoto | |
| 2009/0202157 A1* | 8/2009 | Zhang | G06K 9/6255 382/224 |
| 2009/0310955 A1* | 12/2009 | Lien | H04N 5/2351 396/153 |
| 2011/0032432 A1 | 2/2011 | Lee | |
| 2014/0192228 A1 | 7/2014 | Lee | |
| 2014/0211065 A1 | 7/2014 | Sudheendra et al. | |
| 2015/0010239 A1* | 1/2015 | He | G06K 9/00664 382/203 |
| 2016/0127653 A1 | 5/2016 | Lee et al. | |
| 2016/0284095 A1* | 9/2016 | Chalom | G06K 9/627 |
| 2017/0374246 A1* | 12/2017 | Wang | H04N 5/2257 |
| 2019/0114781 A1* | 4/2019 | Gao | G06K 9/6261 |
| 2020/0021733 A1* | 1/2020 | Liu | H04N 5/23219 |

FOREIGN PATENT DOCUMENTS

| | | |
|---|---|---|
| KR | 10-1161471 | 2/2009 |
| KR | 1020090125602 | 12/2009 |
| KR | 1020140098009 | 8/2014 |
| KR | 10-2016-0051390 | 5/2016 |
| KR | 10-1624648 | 5/2016 |
| KR | 1020160093293 | 8/2016 |

* cited by examiner

METHOD FOR PROCESSING IMAGE BASED ON SCENE RECOGNITION OF IMAGE AND ELECTRONIC DEVICE THEREFOR

CROSS-REFERENCE TO RELATED APPLICATION

This application is based on and claims priority under 35 U.S.C. § 119(a) to Korean Patent Application No. 10-2018-0092707, filed on Aug. 8, 2018, in the Korean Intellectual Property Office, the entire disclosure of which is incorporated herein by reference.

BACKGROUND

1. Field

The disclosure relates generally to a method for processing an image based on a recognized scene of the image and an electronic device for performing the method.

2. Description of Related Art

An image-based service may be performed based on information extracted by analyzing an image. To improve user experience, various image-based services may be provided. For example, a retrieving service, an image editing service, an image conversion service, or an image quality recommendation service, which is based on image analysis, may be provided to the user.

A conventional electronic device may set the quality of an image, based on the analysis of the image. For example, the electronic device may correct an obtained image by changing an image parameter for the image. The electronic device may also recommend an optimal photographing environment, based on the analysis of the image. The electronic device may provide a user with an image which is obtained depending on an image quality setting adjusted using a photographing setting value corresponding to the image.

A conventional electronic device may also provide a method for adjusting image quality settings of various images. For example, the electronic device may provide various filters for adjusting the image quality settings of obtained images. In another example, the electronic device may provide various photographing modes for adjusting an image quality setting of an image. However, complexity may be increased due to the selection of the filter or the photographing mode.

The electronic device may also perform image analysis based on raw data. However, for image analysis based on the raw data, the image may be analyzed based on pixel values of the image, rather than the context information of the image. Therefore, according to the image analysis based on the raw data, the electronic device may provide results that do not correspond to the context of the user.

SUMMARY

Aspects of the disclosure are designed to address at least the above-described problems and/or disadvantages and to provide at least the advantages described below.

Accordingly, an aspect of the disclosure is to provide a method for correcting an image corresponding to a context of a user.

In accordance with an aspect of the disclosure, an electronic device is provided, which includes a camera, a memory, and a processor operatively connected with the camera and the memory. The processor is configured to obtain, using the camera, a plurality of images for one or more external objects, identify a region of interest and a background region by using one or more images of the plurality of images, while obtaining the plurality of images, recognize a first object included in the region of the interest, identify a type of the background region by recognizing a second object included in the background region, determine a scene corresponding to the one or more images, based on the recognized first object and the identified type of the background region, and adjust at least one of an image quality setting associated with the camera or an image quality setting associated with the one or more images by using a specified image quality setting corresponding to the determined scene.

In accordance with another aspect of the disclosure, an electronic device is provided, which includes a camera, a display, a processor operatively connected with the camera and the display, and a memory operatively connected with the processor. The memory includes instructions, which when executed, cause the processor to obtain an image, identify an object from a partial region of the obtained image, identify a first tag corresponding to the identified object, identify a second tag corresponding to an entire region of the obtained image, identify a scene tag corresponding to the obtained image based on reliabilities of the first tag and the second tag, and adjust an image quality setting parameter of the camera using an image quality setting parameter corresponding to the identified scene tag.

In accordance with another aspect of the disclosure, a method is provided for setting image quality in an electronic device. The method includes obtaining an image; identifying an object from a partial region of the obtained image; identifying a first tag corresponding to the identified object; identifying a second tag corresponding to an entire region of the obtained image; identifying a scene tag corresponding to the obtained image, based on reliabilities of the first tag and the second tag; and adjusting an image quality setting parameter of a camera of the electronic device by using an image quality setting parameter corresponding to the scene tag.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Various embodiments of the disclosure are described with reference to accompanying drawings. Those skilled in the art should understand that following embodiments and terminology used herein are not to limit the technology disclosed herein to a specific embodiment, but include modifications, equivalents, and/or alternatives of the described embodiments.

Figure 1:
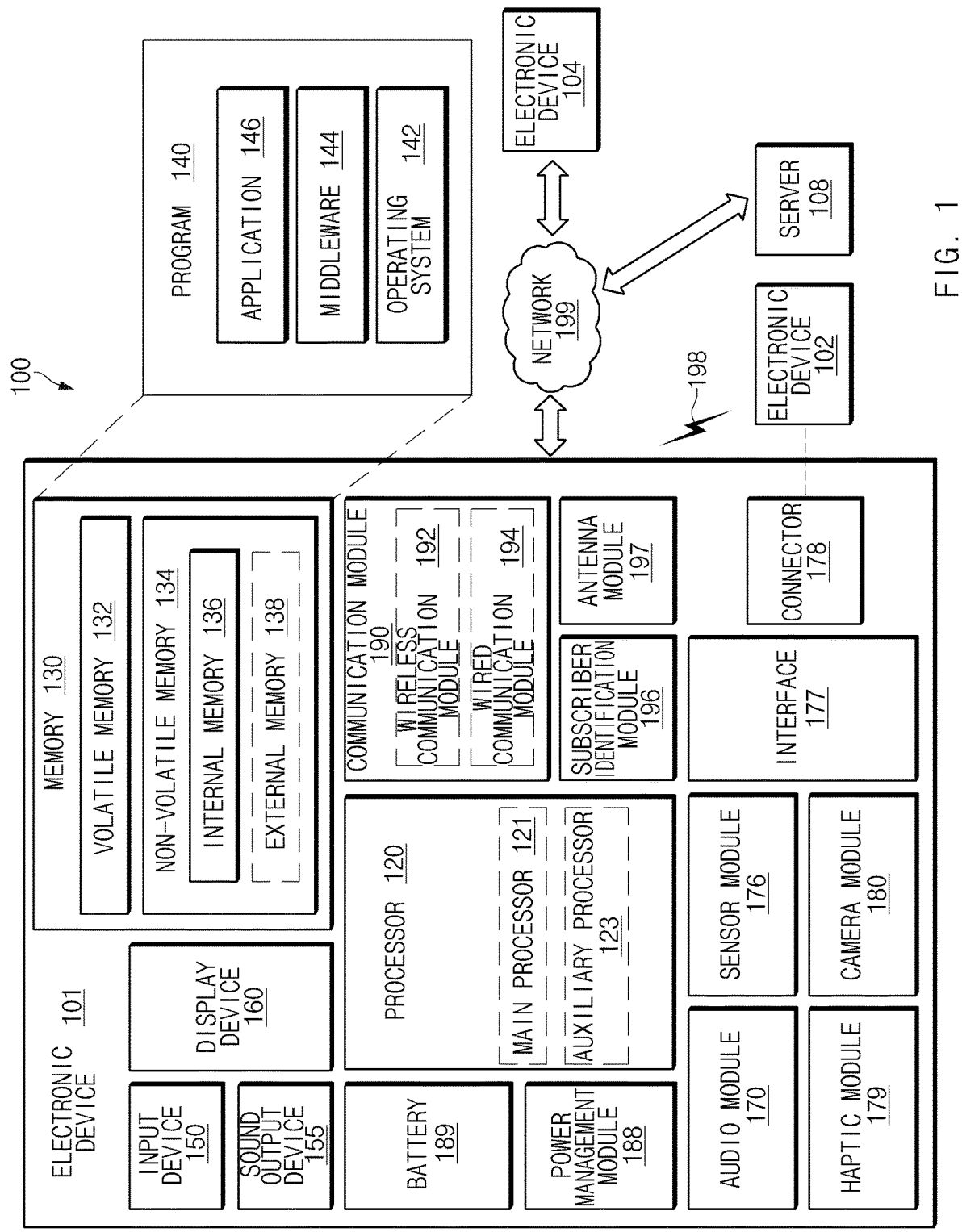
FIG. 1 illustrates an electronic device in a network, according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 includes the processor 120, the memory 130, the display 160, the camera 180, and/or the communication circuitry 190.

The camera 180 may include at least one camera module. For example, the camera 180 may include a plurality of camera modules and may obtain an image using at least one of the plurality of camera modules under the control of the processor 120. The camera 180 may be controlled based on a plurality of parameters associated with photographing. For example, the parameters associated with the photographing may include at least one of photosensitivity, a lens diameter, an aperture size, a shutter speed, focus, exposure, hue, a color temperature, or white balance.

The processor 120 may display an image on at least a portion of the display 160. For example, the processor 120 may obtain an image from the electronic device 104 using the camera 180 or the communication circuitry 190.

The electronic device 101 may perform scene recognition. For example, the electronic device 101 may recognize a foreground (e.g., an object region) and background of an image, and may perform the scene recognition based on the recognized foreground and background. The foreground corresponds to the object region, and the background may correspond to an entire region of an image including the object region. Alternatively, the foreground may correspond to the object region, and the background may correspond to a remaining region of the image except for at least a portion of the object region.

The electronic device 101 may perform the scene recognition based on a specified condition. For example, the electronic device 101 may determine whether to perform scene recognition based on the similarity between an image, which is previously obtained, and an image which is currently obtained. Alternatively, the electronic device 101 may determine whether to perform the scene recognition based on at least one of a specified time, the state of the camera 180 (e.g., focus and exposure), or the brightness of the obtained image.

The electronic device 101 may adjust an image quality setting based on the recognized scene. The electronic device 101 may adjust the image quality setting by adjusting at least one parameter associated with the obtaining an image by the camera 180. For example, the electronic device 101 may adjust at least one of photosensitivity, a lens diameter, an aperture size, a shutter speed, focus, exposure, hue, a color temperature, or white balance of the camera 180.

The electronic device 101 may adjust the image quality setting by adjusting at least one image parameter of the obtained image. For example, the electronic device 101 may perform image correction by adjusting the brightness, contrast, gamma, hue, color space, sharpness, blur, or a color temperature of the image.

The electronic device 101 may perform image retrieval based on the recognized scene. For example, the electronic device 101 may retrieve the name of an object when the object of the recognized scene corresponds to a flower, an animal, a bird, or a tree. As another example, the electronic device 101 may retrieve the name and/or recipe of food when the object of the recognized scene corresponds to the food. When the recognized scene corresponds to a street, the electronic device 101 may estimate user context (e.g., path finding) corresponding to the recognized scene, and obtain the information on the current position of the electronic device 101 depending on the estimated user context. As another example, the electronic device 101 may recognize a text contained in the image, translate the text, retrieve the text, and/or scan a document.

At least some of the operations of the electronic device 101 described above may be performed by an external electronic device 104.

Scene recognition may be performed by the electronic device 104, and the electronic device 101 may receive the result of the scene recognition from the electronic device 104. The scene recognition may be performed by the external electronic device 104, and the electronic device 101 may receive an image quality setting parameter corresponding to the scene recognition from the external electronic device.

The scene recognition and the image quality setting may be adjusted by the electronic device 104. For example, the electronic device 101 may receive an image, which is corrected based on the adjusted image quality setting, from the electronic device 104.

Figure 2:
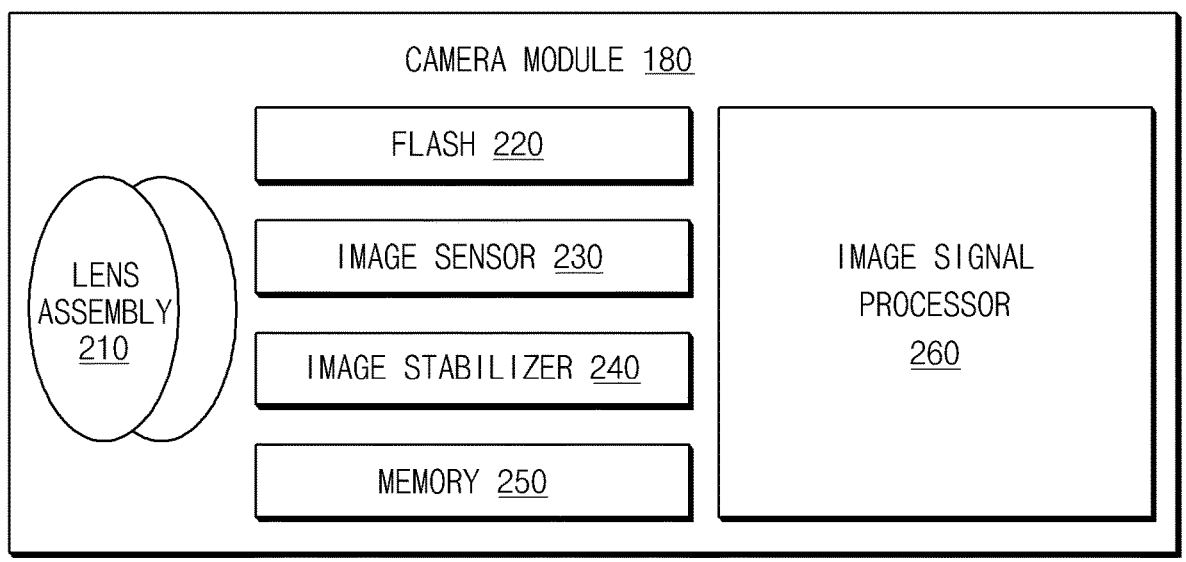
FIG. 2 illustrates a camera module, according to an embodiment.

FIG. 2 illustrates a camera module according to an embodiment.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
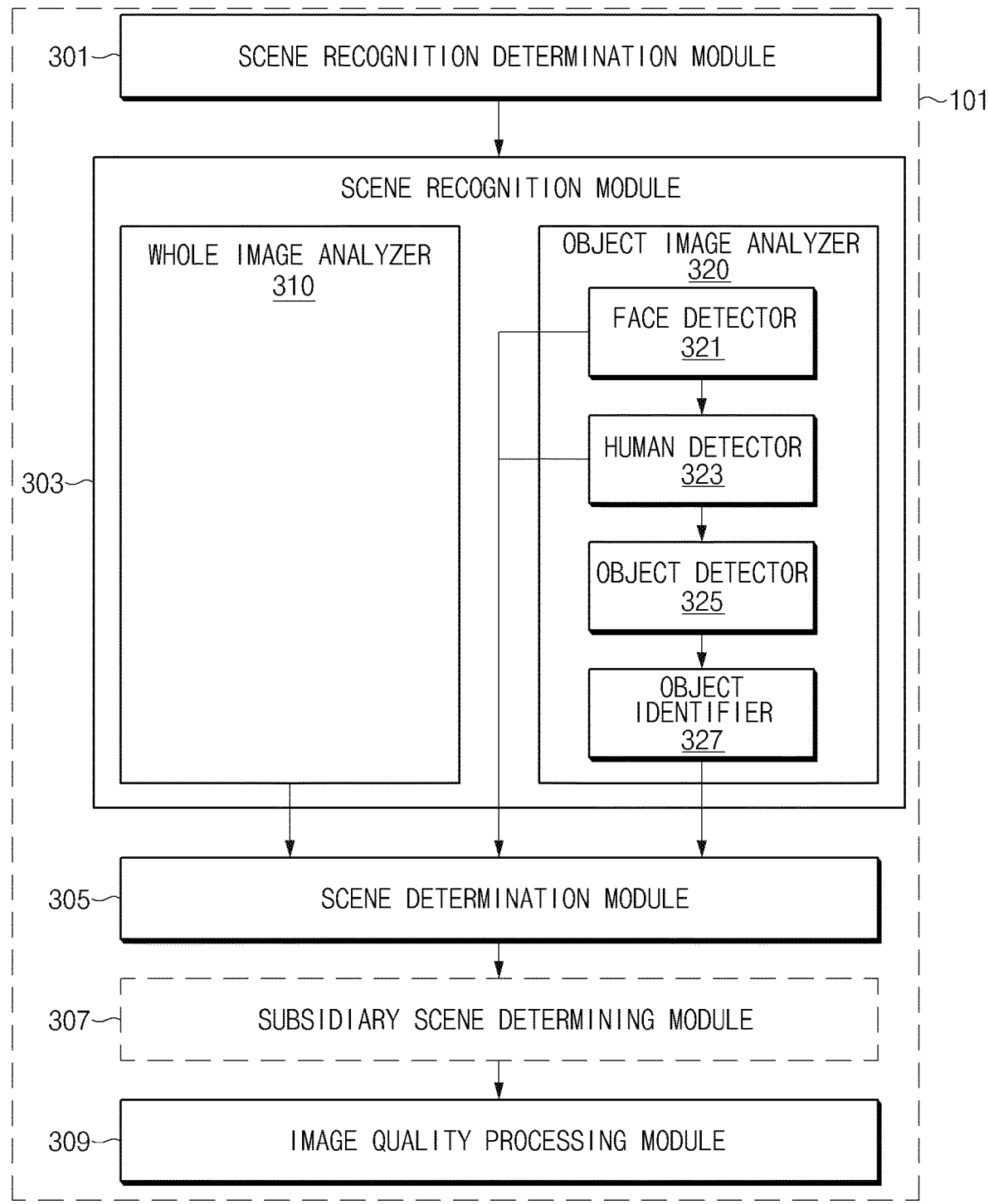
FIG. 3 illustrates an electronic device, according to an embodiment.

FIG. 3 illustrates an electronic device, according to an embodiment.

Referring to FIG. 3, the electronic device 101 includes a scene recognition determination module 301, a scene recognition module 303, a scene determination module 305, a subsidiary scene determination module 307, and an image quality processing module 309.

The components of the electronic device 101 in FIG. 3 are provided for illustrative purposes, and are not limited to the components illustrated in FIG. 3. The components of the electronic device 101 illustrated in FIG. 3 may be software modules, e.g., software functions and/or data produced as instructions stored in a memory of the electronic device 101 that are performed by the processor.

The scene recognition determination module 301 may determine whether to perform scene recognition, based on the obtained image. The scene recognition determination module 301 may determine whether to perform the scene recognition based on various criteria. The scene recognition determination module 301 may be used to reduce power consumption resulting from the scene recognition, to maintain the consistency of the scene recognition, and to prevent errors in the scene recognition. The scene recognition determination module 301 may determine whether to perform the scene recognition, based at least partially on at least one of a camera state, a timer, image brightness, image similarity, or motion information of the electronic device 101.

The scene recognition determination module 301 may determine whether to perform the scene recognition, based on the state of the camera. For example, the scene recognition determination module 301 may determine to perform the scene recognition, when the camera obtains automatic exposure and automatic focus. The scene recognition determination module 301 may perform or determine the scene recognition when the state of the automatic exposure is converged to a certain exposure level and the automatic focus is focused.

The scene recognition determination module 301 may determine whether to perform the scene recognition based on the timer. For example, the scene recognition determination module 301 may determine not to perform the scene recognition, when a specified first time does not elapse from the scene recognition which has been the most lastly performed. In this case, the scene recognition determination module 301 may determine to perform the scene recognition, after the specified first time elapses from the scene recognition which has been the most lastly performed.

The scene recognition determination module 301 may determine to perform the scene recognition, when a specified second time elapses from the scene recognition which has been the most lastly performed. In this case, when the specified second time has elapsed, the scene recognition determination module 301 may regard the validity period for the previous scene recognition as being expired, and determine to perform new scene recognition.

The scene recognition determination module 301 may determine whether to perform the scene recognition, based on the motion of the electronic device 101. For example, the scene recognition determination module 301 may determine not to perform the scene recognition, when the motion of the electronic device 101 is greater than or equal to a specific range. The scene recognition determination module 301 may determine to perform the scene recognition, when the motion of the electronic device 101 is less than a specific range. As another example, the scene recognition determination module 301 may determine to perform the scene recognition, when the motion of the electronic device 101 is less than a specific range for a specific time.

The scene recognition determination module 301 may determine whether to perform the scene recognition, based on the brightness of the image. For example, the scene recognition determination module 301 may determine not to perform scene recognition based on a relevant image, when the brightness (e.g., the average brightness of the image) of the image is less than a specified value. The scene recognition determination module 301 may determine to perform the scene recognition based on a relevant image, when the brightness (e.g., the average brightness of the image) of the image is greater than or equal to a specified value.

The scene recognition determination module 301 may determine whether to perform the scene recognition, based on the similarity between images. For example, when a scene, which is previously recognized, is present within a specified time, and when the similarity between a previous image, which is used for recognition of a previous scene, and a present image is greater than or equal to a specified value, the scene recognition determination module 301 may determine not to perform the scene recognition. The scene recognition determination module 301 may determine to perform the scene recognition, when the similarity between the previous image and the present image is less than the specified value.

The conditions for the scene recognition described above may be combined with each other. The scene recognition determination module 301 may identify the state of the camera 180 when a specified time elapses from the last scene recognition. When the state of the camera 180 corresponds to a specified state (e.g., automatic exposure and automatic focus obtained), the scene recognition determination module 301 may obtain the information on the motion of the electronic device 101.

When the obtained motion information is less than the specified range, the scene recognition determination module 301 may obtain the information on the brightness of the image. When the obtained motion information is less than the specified range, the scene recognition determination module 301 may determine whether the state of the camera 180 corresponds to a specified state after the specified time elapses.

When the state of the camera 180 corresponds to the specified state, the information on the brightness of the image may be obtained. When the obtained information on the brightness of the image is greater than or equal to the specified value, the scene recognition determination module 301 may determine the similarity to the previous image. When the similarity to the previous image is less than the specified value, the scene recognition determination module 301 may determine to perform the scene recognition.

As another example, when the scene recognition has not been previously performed (e.g., within a specified time), the scene recognition determination module 301 may determine to perform the scene recognition, regardless of the similarity to the previous image.

The scene recognition module 303 includes a whole image analyzer 310 and an object image analyzer 320.

The scene recognition module 303 may analyze an image using the whole image analyzer 310 and/or the object image analyzer 320 and may transmit the analysis result to the scene determination module 305. The scene recognition module 303 may determine the type (e.g., a scene tag) of a scene, based on the result of the recognition of an object (e.g., a human (person), an animal, a flower, or a tree) in the image and the semantic analysis of the whole image.

The whole image analyzer 310 may determine the type of an image by using information on the whole features of the image. For example, the whole image analyzer 310 may obtain the scene type of the image. The whole image analyzer 310 may identify a tag (e.g., a semantic tag) corresponding to the whole image. The whole image analyzer 310 may determine the scene type of the image using feature information for the background region, except for the object region of the image. The scene type of the image of the whole image analyzer 310 may include at least one category (e.g., a tag) for describing the scene. The scene type may be a mountain, a sunrise, a sunset, a landscape, a beach, a sky, snow, a night view, a street, a house, a waterside, a waterfall, a city, greenery, a tree, a flower garden, and/or an invalidity. For example, even if the size of a region of interest is less than a specified size, so the size of the region is not identified as a person, a face, or an object, the whole image analyzer 310 may detect the type corresponding to the object.

The object image analyzer 320 may identify at least one object from the region of interest of the image. For example, the object image analyzer 320 may identify at least one object from a portion of the image. The object image analyzer 320 may identify a tag corresponding to the identified object.

The object image analyzer 320 includes a face detector 321, a human detector 323, an object detector 325, and/or an object identifier 327.

The face detector 321 may detect a face from a region of interest. The face detector 321 may transmit object information (e.g., a tag) corresponding to the face to the scene determination module 305 when a face image satisfying a specified condition is detected from the image. The face detector 321 may determine a face as being detected, when a face in a specified size or more is detected. The face detector 321 may determine a face as being detected, when a face image having a specified percentage of the whole image is detected, when the face image (e.g., the center of the face or the border of the face) is spaced from the boundary of the image by more than a specified distance, or when the face image is positioned at the center of the image. The face detector 321 may perform a separate algorithm to distinguish between a face of a human and a face of an object (e.g., a mannequin or stone statue).

The human detector 323 may detect a human from a region of interest. For example, the human detector 323 may detect a human region corresponding to a human from the region of interest, or may detect a human region from the region of interest and detect the human using a face region in less than a specified size detected by the face detector 321. The human detector 323 may determine whether the human is detected, based on the overlap degree of the face region and the human region. The human detector 323 may transmit object information corresponding to the human to the scene determination module 305 when the human is detected.

The object detector 325 may identify an object region from the region of interest. The object detector 325 may identify the object region by identifying the region of interest from the image based on information on the image (e.g., a saliency map and/or an index map). The object detector 325 may identify the object region by identifying a boundary corresponding to the object. The object detector 325 may transmit the information on the object region to the object identifier 327 when the identified object region is greater than or equal to a specified size. The object detector 325 may identify the object region when no face or human is detected by the face detector 321 and the human detector 323. When the object region having the specified size or more is not identified, the object detector 325 may transmit a tag corresponding to "invalid" to the scene determination module 305.

The object identifier 327 may identify an object from the object region. For example, the object identifier 327 may identify an object such as an animal, a bird, a tree, food, or a flower. The object identifier 327 may transmit information on the identified object to the scene determination module 305.

The scene determination module 305 may determine a scene (e.g., a tag corresponding to the scene) based on a scene type (e.g., a tag) from the whole image analyzer 310 and the object information from the object image analyzer 320. When receiving a meaningful face (i.e., a size of the face is greater than a predetermined size, a ratio of the face to the whole image is greater that a predetermined ration, or a reliability for detected face is greater than a predetermined reliability) or human detection result from the face detector 321 or the human detector 323, the scene determination module 305 may determine the image as a picture of a human. When the object information is received from the object identifier 327, the scene determination module 305 may determine the image as a picture corresponding to an object, based on the position of the object region corresponding to the object and/or the reliability of the object. The scene determination module 305 may determine the image as the picture corresponding to the object, when the position of the object region is positioned at the center of the image and/or when the reliability for the identified object is greater than or equal to a specified value. The scene determination module 305 may determine the reliability of the identified image by using a recognition engine (e.g., a deep network) of the electronic device 101 or an external electronic device. The scene determination module 305 may determine the scene of the image, based on the scene type of the image analyzed by the whole image analyzer 310, when it is determined that the image does not correspond to a face, a human, and an object. The scene determination module 305 may determine a scene of an image based on a scene type, when the reliability of the scene type by the whole image analyzer 310 is higher than a specified value.

The scene determination module 305 may analyze the validity of the scene type analyzed by the whole image analyzer 310. For example, when the scene type corresponding to the night view is detected by the whole image analyzer 310, but when the time for obtaining the image is daytime or in the morning, the scene determination module 305 may ignore the scene type analysis by the whole image analyzer 310.

The scene determination module 305 may determine a scene (e.g., a tag corresponding to a scene), based on the reliability of the scene type (e.g., a tag) from the whole image analyzer 310 and the reliability of the object information (e.g., a tag) from the object image analyzer 320. The reliability of the face or human detected by the object image analyzer 320 may be set to be higher than the information on another object. The electronic device 101 may obtain the reliability of the scene type analyzed by the whole image analyzer 310 using a recognition engine (e.g., a deep network) of the electronic device 101 or the external electronic device.

The scene recognition module 303 may use the whole image analyzer 310 based on the analysis result of the object image analyzer 320. For example, when an effective face region larger than a specified size is detected by the face detector 321, the scene recognition module 303 may not use the human detector 323, the object detector 325, the object identifier 327, and the whole image analyzer 310. As another example, the scene recognition module 303 may not use the whole image analyzer 310 when a face or human is detected by the object image analyzer 320 or an object having more than a specified reliability is detected. The scene recognition module 303 may determine a scene type of an image by using the whole image analyzer 310 when the object image analyzer 320 fails to detect the face, the human, and the object having specified reliability.

The scene recognition module 303 may utilize the whole image analyzer 310 independently of the object image analyzer 320. The scene recognition module 303 may use the object image analyzer 320 and the whole image analyzer 310 in parallel.

A subsidiary scene determination module 307 may determine a scene of an image, when the scene is not determined by the scene determination module 305. For example, when the scene determination module 305 may not determine the scene (e.g., when the face, human, and object are not identified and the reliability of the scene type is less than the specified range), the subsidiary scene determination module 307 may determine reliability based on the sum of reliabilities for upper-level categories of scene types identified by the scene determination module 305. A scene type may be identified as a mountain, a waterside, or a beach, based on a picture and the reliability of each of identified scene types may be less than a specified value. In this case, the subsidiary scene determination module 307 may determine a scene as a landscape which is an upper-level category of the mountain, the waterside, and the beach, when the sum of the reliabilities of the mountain, the waterside, and the beach is greater than or equal to a specified value. The subsidiary scene determination module 307 may analyze the validity of the determined scene. For example, the subsidiary scene determination module 307 may determine the validity of the determined scene, based on a time at which the image is obtained and/or information on a place at which the image is obtained.

The scene determination module 305 may determine the scene using the result having the highest reliability derived by the whole image analyzer 310 and the object image analyzer 320. The subsidiary scene determination module 307 may determine the scene using both a result (e.g., a scene type less than specified reliability), which is not considered by the scene determination module 305, and the highest reliability result.

Alternatively, the subsidiary scene determination module 307 may be omitted, or the subsidiary scene determination module 307 may be included in the scene determination module 305.

The image quality processing module 309 may adjust the image quality setting using the scene determined by the scene determination module 305 or the subsidiary scene determination module 307 (e.g., a scene tag). The image quality processing module 309 may generate an image subject to an image quality setting, which is adjusted by modifying image parameters with respect to the obtained image. For example, the image parameters may include at least one of brightness, contrast, gamma, hue, sharpness, blur, and/or color temperature.

The image quality processing module 309 may adjust the image quality setting by adjusting at least one parameter, which is associated with obtaining an image, of the camera 180. The at least one parameter may include at least one of photosensitivity, a lens diameter, an aperture size, a shutter speed, exposure, focus, a hue, a color temperature, and/or white balance. When no meaningful results are received from the scene determination module 305 and the subsidiary scene determination module 307, the image quality processing module 309 may adjust the image quality setting using a specified image parameter or the parameters associated with obtaining the image.

Figure 4:
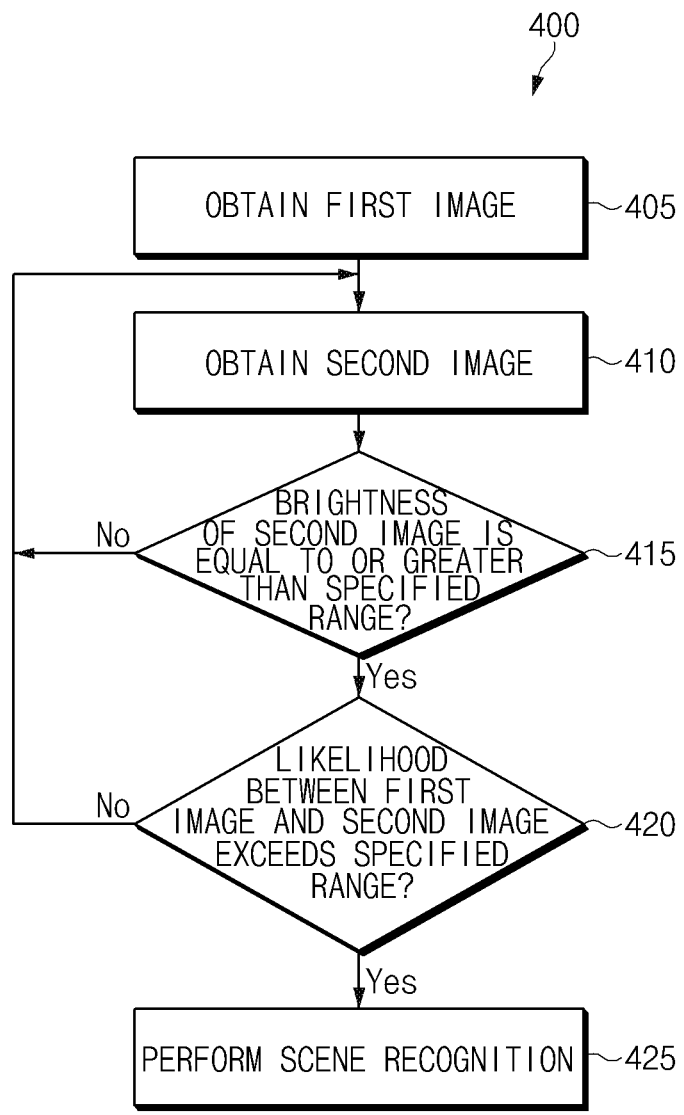
FIG. 4 is a flowchart illustrating a method for determining scene recognition, according to an embodiment.

FIG. 4 is a flowchart 400 illustrating a method for determining scene recognition, according to an embodiment.

For example, the method for determining scene recognition of FIG. 4 may be an example of determining whether to perform scene recognition by the scene recognition determination module 301 of FIG. 3.

Referring to FIG. 4, in step 405, the electronic device 101 (e.g., the processor 120) obtains a first image. For example, the electronic device 101 may obtain the first image using a camera. The electronic device 101 may adjust the image quality setting for the first image using the obtained first image.

In step 410, the electronic device 101 obtains a second image. For example, the electronic device 101 may obtain the second image by using the camera 180. The electronic device 101 may obtain the second image in a specified time after the first image is obtained. The electronic device 101 may obtain the second image, based on the camera state (e.g., automatic exposure and automatic focus states) and/or the movement information of the electronic device 101.

In step 415, the electronic device 101 determines whether the brightness of the second image is greater than or equal to a specified range. For example, the electronic device 101 may determine the second image as a valid image when the brightness of the second image (e.g., average brightness) is in the specified first range. The electronic device 101 may determine the second image as an invalid image when the brightness of the second image is within a second range less than the specified first range. The electronic device 101 may obtain a new second image when the second image is determined to be the invalid image.

When the brightness of the second image is greater than or equal to the specified range, the electronic device 101 determines whether the similarity between the first image and the second image is greater than or equal to a specified range in step 420. For example, the electronic device 101 may determine the similarity, based on a difference between the first image and the second image, features of the first image and the second image, and/or the correlation between the first image and the second image.

When the similarity between the first image and the second image is in a specified second range less than the specified first range, the electronic device 101 determines to perform the scene recognition based on the second image in step 425.

When the similarity between the first image and the second image is in the specified first range exceeding the specified second range, the electronic device 101 determines to not perform the scene recognition for the second image. In this case, the electronic device 101 may adjust the image quality setting for the second image, based on the image quality setting determined for the first image.

Figure 5:
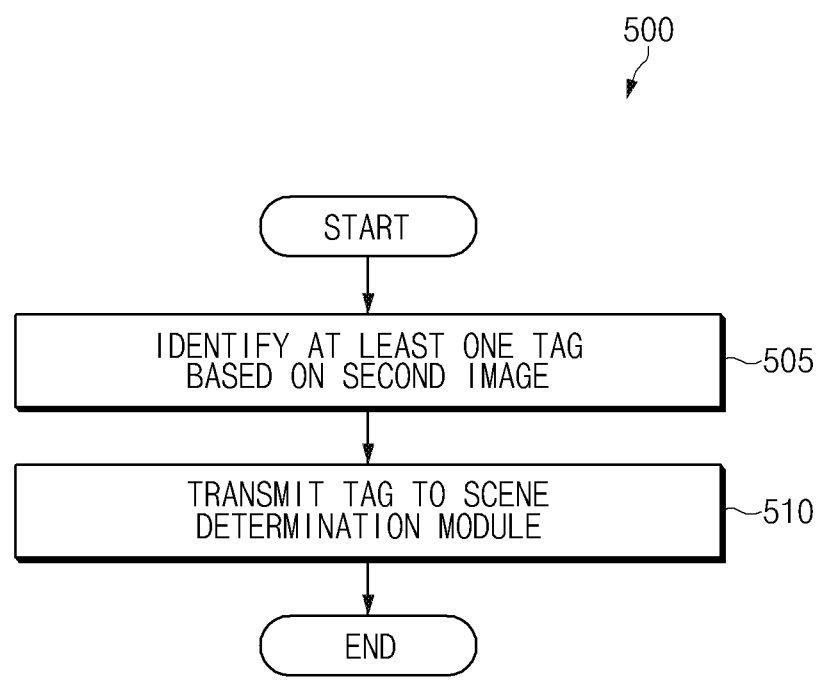
FIG. 5 is a flowchart illustrating a method for determining a type of a background image, according to an embodiment.

FIG. 5 is a flowchart 500 illustrating a method for determining a type of a background image, according to an embodiment.

For example, the method for determining the background image type in FIG. 5 may be an example of a method for determining a scene by the whole image analyzer 310 in FIG. 3.

Referring to FIG. 5, in step 505, the electronic device 101 may identify at least one tag based on a second image. For example, the electronic device 101 may identify at least one tag corresponding to a scene type of the second image based on the entire image region of the second image. The electronic device 101 may determine the at least one tag identified based on the entire image region and reliability corresponding to the at least one tag. The electronic device 101 may determine the reliability of the at least one tag based at least on a ratio of an image region associated with the at least one tag.

In step 510, the electronic device 101 transmits the identified tag to a scene determination module 305. The electronic device 101 may transmit, to the scene determination module 305, the information on the at least one tag and the reliability of the at least one tag.

The electronic device 101 may perform the method for determining the background image type of FIG. 5, when the object is not identified based on the second image.

Figure 6:
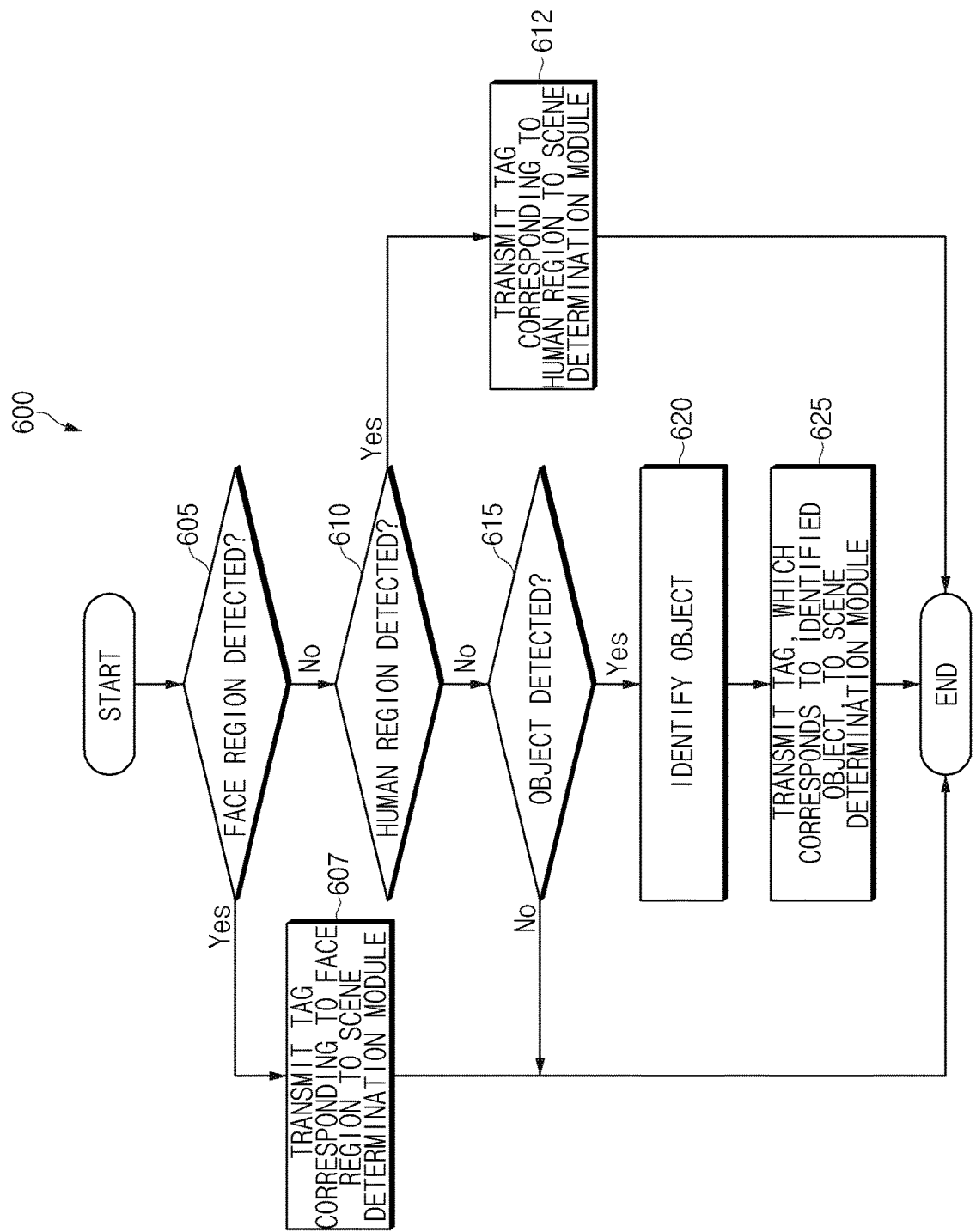
FIG. 6 is a flowchart illustrating a method for identifying an object, according to an embodiment.

FIG. 6 is a flowchart 600 illustrating a method for identifying an object, according to an embodiment.

For example, the method for identifying the object in FIG. 6 may be an example of a method for identifying an object by the object image analyzer 320.

Referring to FIG. 6, in step 605, the electronic device 101 determines whether a face region is detected from a second image. For example, the electronic device 101 may determine that the face region is detected, when a valid face region having a predetermined size (e.g., a specified ratio) is detected from the second image.

In step 607, when a face region is detected in step 605, the electronic device 101 transmits a tag corresponding to the detected face region to the scene determination module 305.

For example, the electronic device 101 may transmit, to the scene determination module 305, a tag corresponding to a plurality of face regions for detecting a plurality of valid face regions having a specified size or more.

When the face region is not detected in step 605, the electronic device 101 determines whether a human region is detected in step 610. For example, the electronic device 101 may detect the human region by identifying an object corresponding to the human from the second image. As another example, the electronic device 101 may detect the human region based on whether the object corresponding to the human detected from the second image overlaps with the face region (e.g., a face region having less than the specified size). When the human region is detected in step 610, the electronic device 101 transmits, to the scene determination module 305, the tag corresponding to the human region in step 612.

When the human region is not detected in step 610, the electronic device 101 determines whether the object is detected from the second image in step 615. For example, when the object region having the specified size or more is detected from the second image, the electronic device 101 identifies an object corresponding to the object region in step 620. For example, the electronic device 101 may identify a boundary of an object and/or the object based on the feature point of an object region. In step 625, the electronic device 101 transmits a tag corresponding to the identified object to the scene determination module 305.

When the object is not detected in step 615 (e.g., when the object region having less than the specified size is detected, when the reliability of the detected object region is less than the specified reliability, or when the object region is not detected), the electronic device 101 may transmit an image type to the scene determination module 305 depending on the method for determining the image type, e.g., as described above with reference to FIG. 5.

Figure 7:
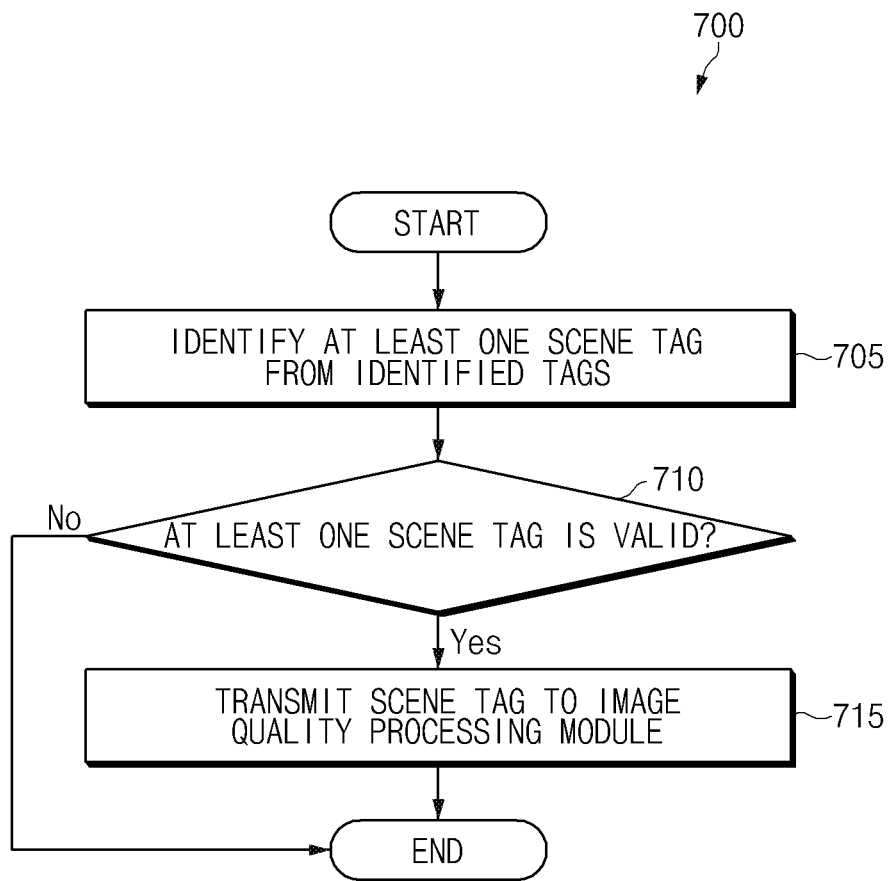
FIG. 7 is a flowchart illustrating a method for determining a scene, according to an embodiment.

FIG. 7 is a flowchart 700 illustrating a method for determining a scene, according to an embodiment.

For example, the method for determining the scene in FIG. 7 may be an example of a method for identifying a scheme by the scene determination module 305 of FIG. 3.

Referring to FIG. 7, the electronic device 101 identifies (or determines) at least one scene tag from identified tags in step 705. For example, the electronic device 101 may determine the scene tag to a tag corresponding to the face or the human when the face or the human is identified. As another example, when an object is identified, the electronic device 101 may determine the scene tag to a tag corresponding to the identified object based at least on the reliability of the identified object. As another example, when the tag corresponding to the scene type is identified, the electronic device 101 may determine the tag corresponding to the scene type as a scene tag based on the reliability of the scene type.

In step 710, the electronic device 101 determines whether at least one scene tag is valid. The electronic device 101 may determine the validity of the scene tag based on at least one of time at which the second image is obtained or a place in which the second image is obtained. For example, the electronic device 101 may determine that the scene tag is invalid when the scene tag does not correspond to the information on the time at which the second image is obtained. The electronic device 101 may determine the scene tag as being invalid when the information on the time, at which the second image is obtained, indicates lunch, evening, or night even though the scene tag corresponds to morning. As another example, the electronic device 101 may determine the scene tag as being invalid when the scene tag does not correspond to the information on the place in which the second image is obtained. The electronic device 101 may determine the scene tag as being invalid when the scene tag corresponds to sun rising and the place information indicates the West coast.

The electronic device 101 may change the scene tag based on the time information and/or the place information when the scene tag is determined as being invalid. For example, when the scene tag corresponds to the morning and the information on the time, at which the second image is obtained, corresponds to the evening, the electronic device 101 may change the scene tag to a tag corresponding to the evening.

In step 715, when the scene tag is determined as being valid, the electronic device 101 transmits, to the image quality processing module 309, the scene tag.

Figure 8:
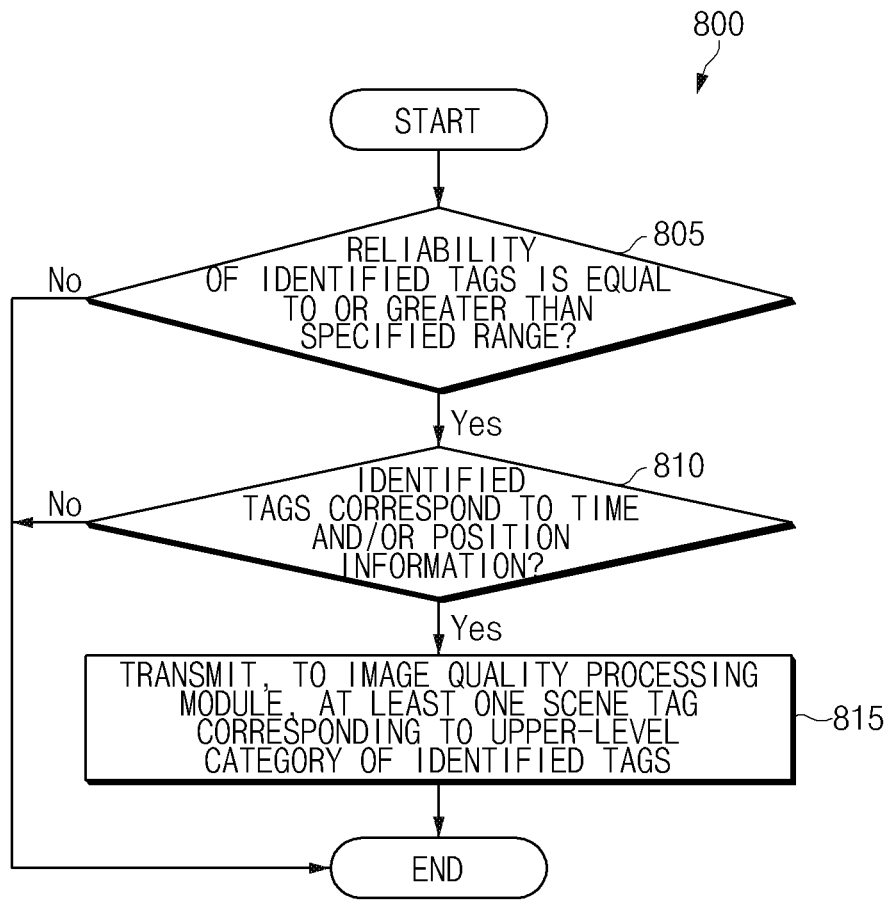
FIG. 8 is a flowchart illustrating a method for subsidiarily determining a scene, according to an embodiment.

FIG. 8 is a flowchart 800 illustrating a method for subsidiarily determining a scene, according to an embodiment.

For example, the method for subsidiarily determining a scene in FIG. 8 may be an example of a method for identifying a scene by a subsidiary scene determining module 307 of FIG. 3.

For example, the electronic device 101 may perform the method for subsidiarily determining the scene as illustrated in FIG. 8, when the scene tag is invalid or when the identified object or scene type is absent, when the image type, which is determined through the method for determining the image type as illustrated in FIG. 5, is not identified or the reliability of the image type is less than a specified value, or when the reliability of the identified object is less than the specified value without identifying the face and human regions through the method for identifying the object as illustrated in FIG. 6.

Referring to FIG. 8, the electronic device 101 determines whether the reliabilities of the identified tags are greater than or equal to a specified range in step 805. For example, the electronic device 101 may determine a scene by using only a tag, which has the reliability greater than or equal to a specified range, of the identified tags (e.g., a tag corresponding to a scene type, a tag corresponding to a face region, a tag corresponding to a human region, and/or a tag corresponding to the object region).

In step 810, when the reliabilities of the identified tags are greater than or equal to the specified range in step 805, the electronic device 101 determines whether at least one identified tag, which has the reliability greater than or equal to the specified range, corresponds to the information on the time and/or the position at which the image is obtained. For example, the electronic device 101 may determine a scene using only tags (e.g., valid tags), which correspond to information on the time and/or the position, of tags having the reliability greater than or equal to the specified range.

In step 815, when at least one identified tag corresponds to the information on the time and/or the position at which the image is obtained in step 810, the electronic device 101 transmits, to the image quality processing module 309 in FIG. 3, at least one scene tag corresponding to an upper-level category of valid tags, which have a specified reliability or more, of the identified tags.

The electronic device 101 may set, as a scene tag, a tag corresponding to an upper-level category, which has the highest reliability, of a plurality of upper-level categories, based on the sum of reliabilities of the valid tags having the specified reliability or more. For example, the electronic device 101 may identify a mountain (e.g., having 33% in reliability), a flower (e.g., having 34% in reliability), and an animal (e.g., having 20% in reliability) from the second image. For example, the electronic device 101 may set, as a scene tag of the second image, woods which are a common upper-level category of the mountain and the flower, based on the sum of the reliabilities of the mountain and the flower.

Figure 9:
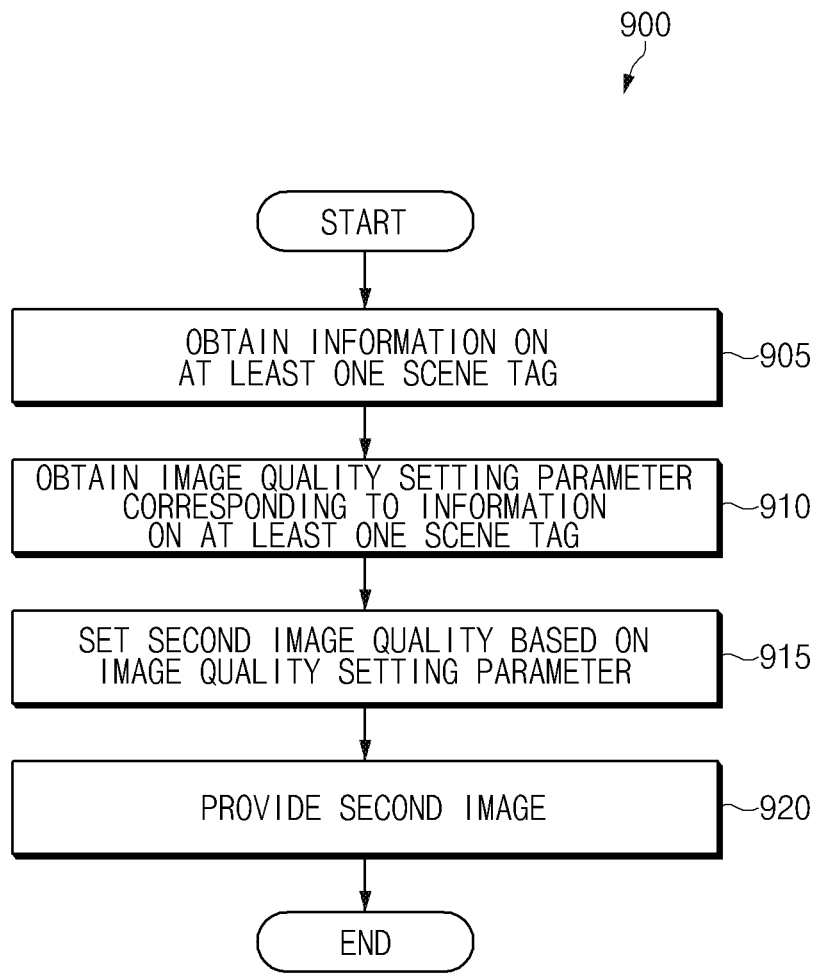
FIG. 9 is a flowchart illustrating a method for determining an image quality setting, according to an embodiment.

FIG. 9 is a flowchart 900 illustrating a method for determining an image quality setting, according to an embodiment.

For example, the method for adjusting the image quality setting of FIG. 9 may be an example of a method for adjusting an image quality setting by the image quality processing module 309 of FIG. 3.

Referring to FIG. 9, in step 905, the electronic device 101 obtains at least one scene tag. For example, the electronic device 101 may obtain a scene tag set through the method for determining a scene in FIG. 7 or the method for subsidiary determining the scene in FIG. 8

In step 910, the electronic device 101 obtains at least one image quality setting parameter corresponding to information on the scene tag. For example, the image quality setting parameter may include at least one of brightness, contrast, gamma, hue, sharpness, blur, or a color temperature. As another example, the image quality setting parameter may include at least one of photosensitivity, a lens diameter, an aperture size, a shutter speed, exposure, focus, hue, color temperature, or white balance. The electronic device 101 may transmit the information on the scene tag to the electronic device 104 of FIG. 1, and may obtain the image quality setting parameter from the external electronic device.

In step 915, the electronic device 101 sets the image quality of the second image based on the obtained image quality setting parameters. For example, the electronic device 101 may adjust the image quality setting parameters of the second image obtained using the obtained image quality setting parameters. As another example, the electronic device 101 may change the photographing parameters of the camera by using the obtained image quality setting parameters, thereby setting the image quality of the second image obtained by the camera 180.

In step 920, the electronic device 101 provides a second image to a display. For example, the second image displayed on the display may be an image obtained depending on the image quality setting adjusted based on the image quality setting parameters.

Figure 10:
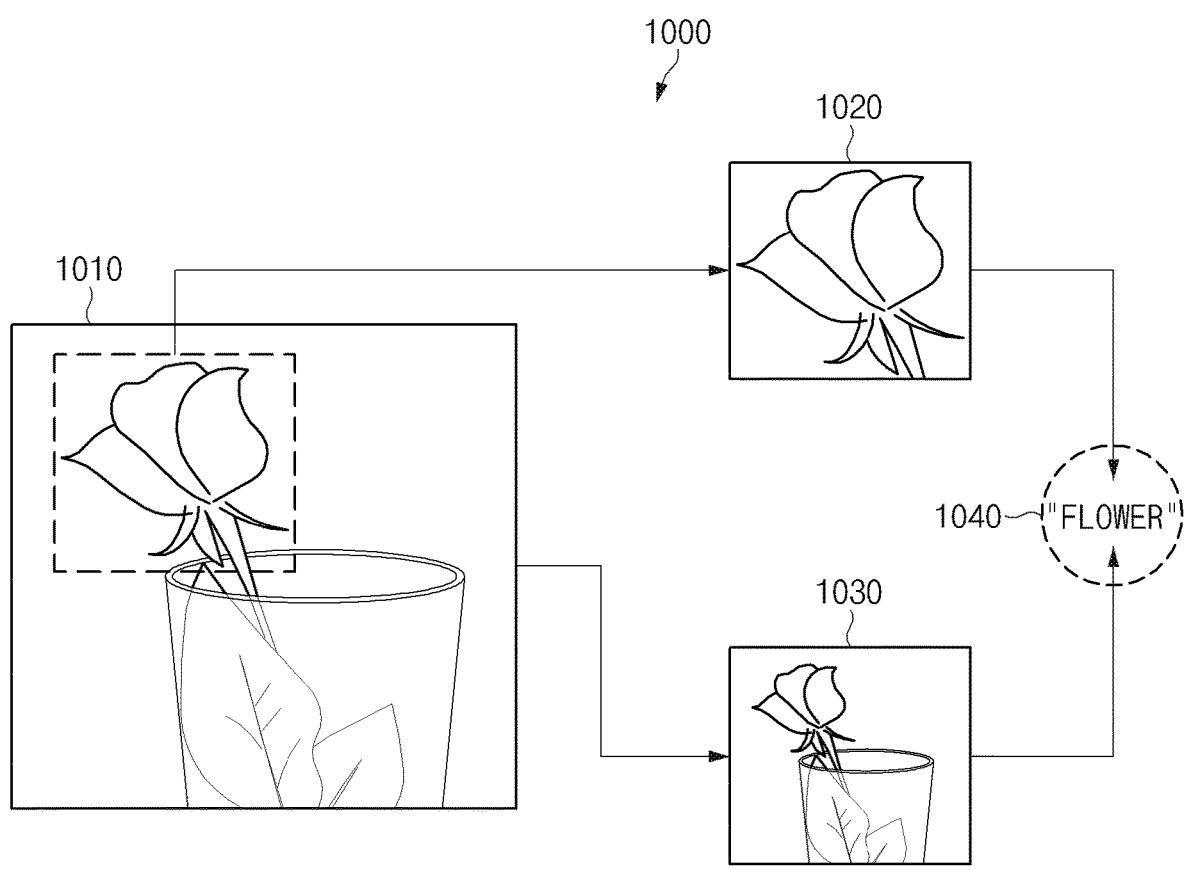
FIG. 10 illustrates a method for recognizing a scene, according to an embodiment.

FIG. 10 illustrates a flow chart 1000 of a method for recognizing a scene, according to an embodiment.

Referring to FIG. 10, the electronic device 101 may perform scene recognition for an obtained image 1010.

The electronic device 101 may extract an object region image 1020 from the obtained image 1010 and may identify the object from the object region image 1020. For example, the electronic device 101 may identify the object region as a flower having 90% in reliability, a tree having 30% in reliability, or foods having 4% in reliability.

The electronic device 101 may identify a scene type based on an entire image 1030 of the obtained image 1010. For example, the electronic device 101 may identify the entire image 1030 as a sky having 33% in reliability.

The electronic device 101 may determine a scene corresponding to the obtained image 1010 based on the reliabilities of the identified object and the identified scene type. For example, when an object is present, which has specified reliability or more, among the object regions, the scene may be determined depending on the object having the highest reliability. For example, the electronic device 101 may determine the scene of the image 1010, which is obtained, as "flower" having the highest reliability.

Figure 11:
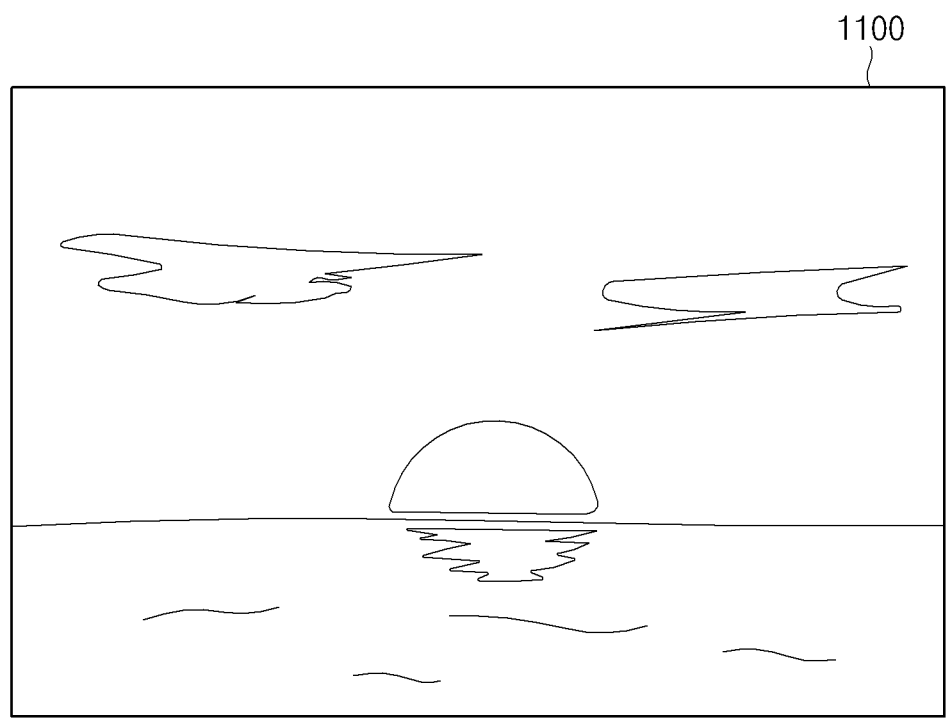
FIG. 11 illustrates an image for determining a reliability, according to an embodiment.

FIG. 11 illustrates an image 1100 for determining a reliability, according to an embodiment.

Referring to FIG. 11, the electronic device 101 may obtain the image 1100 corresponding to a sunrise by using the camera 180 of the electronic device 101. For example, the electronic device 101 may determine the image 1100 as a scene corresponding to a sunset. The electronic device 101 may identify the determined scene as being invalid when the information on time, at which the image is obtained, does not indicate the time corresponding to the sunset. When the information on a place at which the image is obtained corresponds to the East coast, the electronic device 101 may identify the determined scene, which corresponds to the sunset, as being invalid.

Figure 12:
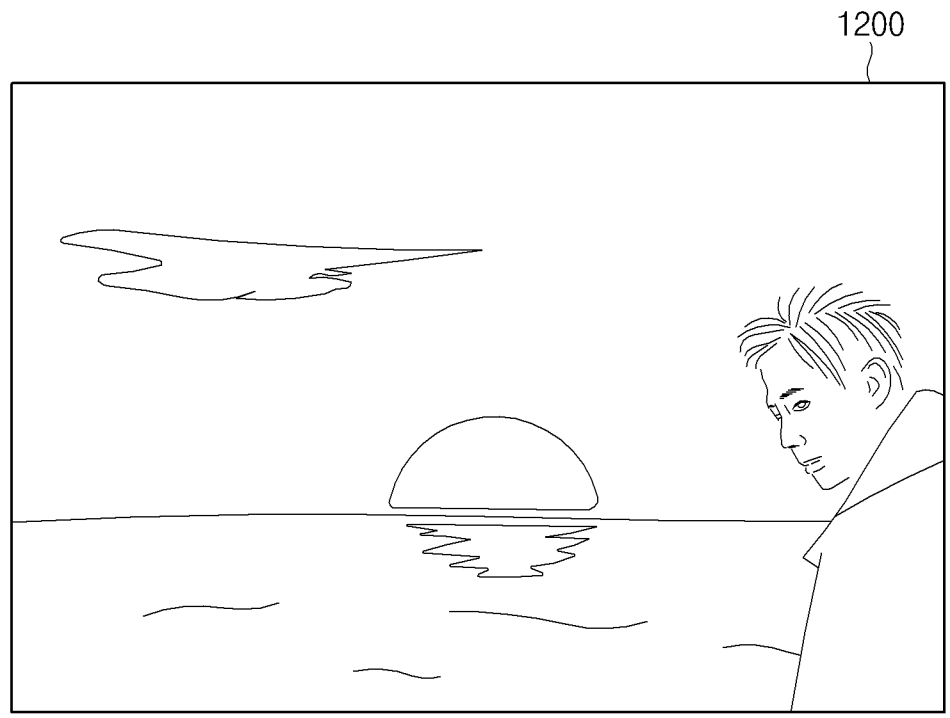
FIG. 12 illustrates an image for recognizing an object, according to an embodiment.
Figure 12:
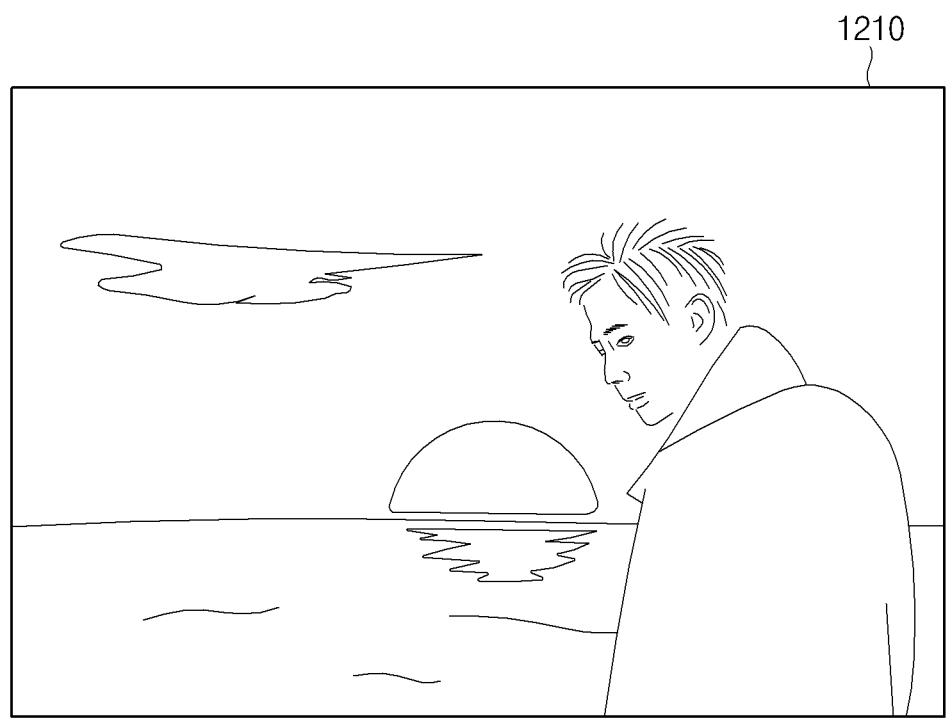

FIG. 12 illustrates an image for recognizing an object, according an various embodiment.

Referring to FIG. 12, the electronic device 101 may detect face regions from a first image 1200 and a second image 1210. The electronic device 101 may determine whether a valid face region has been detected, based at least on the size and the position of the detected face region. For example, the electronic device 101 may determine whether a face region is detected, based at least on the size and the position of the detected face region, even if the face region is detected.

The electronic device 101 may recognize the face region from the first image 1200. When the position of the face region is at the boundary of the first image 1200, the electronic device 101 may not correctly detect the face region. For example, when the position of the face region is positioned at the boundary of the first image 1200, a user may have obtained the first image 1200 without intentionally capturing an image of a human corresponding to the face region. For example, the human contained in the first image 1200 may be a human (e.g., a passerby) that does not meet the intent of the user. In this case, the electronic device 101 may determine a scene based on a scene type (e.g., a sunrise) rather than the face region.

The electronic device 101 may recognize the face region from the second image 1210. For example, the human of the second image 1210 may be positioned at the center of the second image 1210 or at more than a specified distance from the boundary of the second image 1210. In this case, the electronic device 101 may determine the scene based on the recognized face region.

Figure 13:
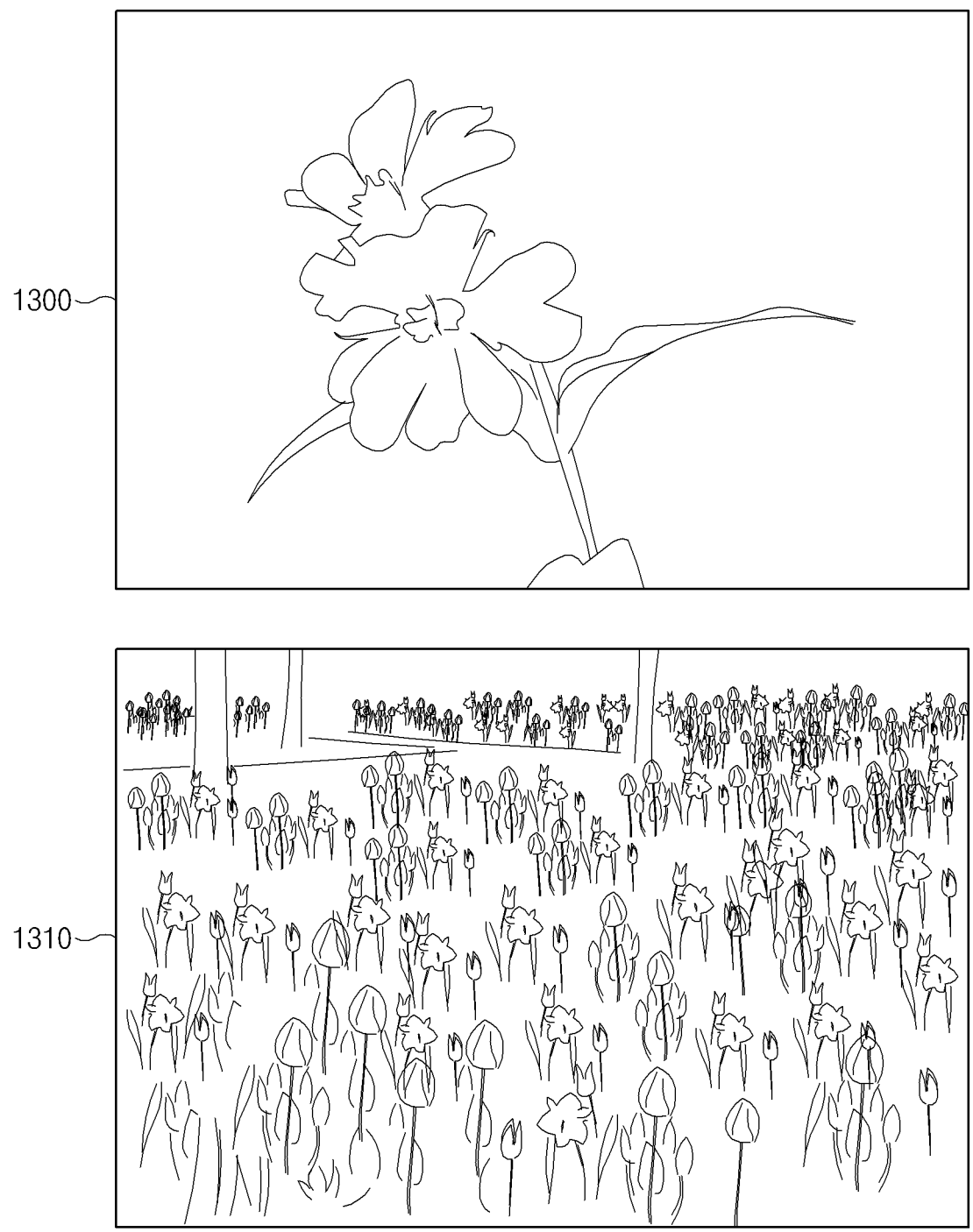
FIG. 13 illustrates an image for determining a scene, according to an embodiment.

FIG. 13 illustrates an image for determining a scene, according to an embodiment.

Referring to 13, the electronic device 101 may not detect a face region and a human region from a first image 1300 and a second image 1310.

The electronic device 101 may identify an object "flower" from the first image 1300. The electronic device 101 may determine the identified "flower" as the scene of the first image 1300. For example, the electronic device 101 may determine the flower corresponding to the identified object as the scene of the first image 1300, when the size (e.g., a ratio based on the entire image) of the identified object has a specified size or more.

The electronic device 101 may identify "flower", which is a scene type, from the second image 1310. In the second image 1310, flowers may have an object region in size less than a specified size. Accordingly, the electronic device 101 may not identify the "flower" based on object recognition from the object region. In this case, the electronic device 101 may identify "flower", which is the scene type, based on the entire region of the second image 1310. The electronic device 101 may identify the scene of the second image 1310 as "flower" based on the reliability of the identified scene type. For example, the electronic device 101 may determine the reliability of the scene type identified based on the size of the region corresponding to "flower" of the second image 1310.

Figure 14:
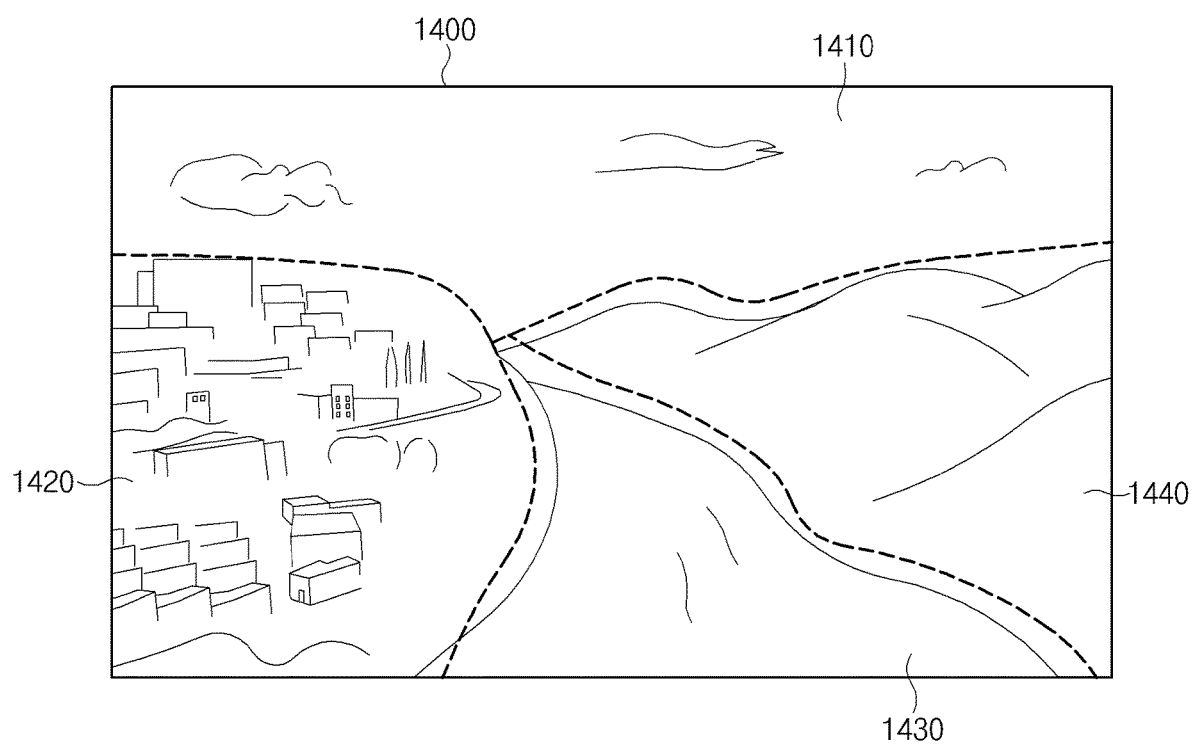
FIG. 14 illustrates an image for determining a scene, according to an embodiment.

FIG. 14 illustrates an image 1400 for determining a scene, according to an embodiment.

Referring to FIG. 14, it is assumed that the electronic device 101 fails to recognize an object (e.g., a face, a human, and/or an object) from the image 1400. For example, the electronic device 101 may determine a scene based on the scene type identified from the image 1400.

The electronic device 101 may identify a plurality of scene types from the image 1400. For example, the electronic device 101 may identify the sky from a first region 1410, a city from a second region 1420, a waterside from a third region 1430, and a mountain from a fourth region 1440. The first region 1410, the second region 1420, the third region 1430, and the fourth region 1440 may be similar to each other in size, within the image 1400. In this case, the reliabilities for the first region 1410, the second region 1420, the third region 1430, and the fourth region 1440 may be similar to each other. For example, because there is no dominant region in the image 1400 of the first region 1410, the second region 1420, the third region 1430, and the fourth region 1440, the scene determination module 305 of FIG. 3 may determine that the reliabilities of all scene types are less than or equal to a specified reliability. Thus, for example, the scene determination module 305 of the electronic device 101 may not determine the image 1400 as one specific scene.

The electronic device 101 may determine an upper-level category of the identified scene type as the scene of the image 1400. For example, the electronic device 101 may determine, as the scene of the image 1400, one of upper-level categories of the identified scene type. For example, the electronic device 101 may determine the upper-level category as the scene of the image 1400, based at least on the sum of reliabilities of the scene types belonging to the upper-level category. When the sum of the reliabilities of the scene types belonging to the upper-level category is greater than or equal to the specified value, the electronic device 101 may determine the upper-level category as the scene of the image 1400.

The electronic device 101 may determine the landscape, which belongs to the upper-level category of the sky, a mountain, a waterside, and a city, as a scene of the image 1400. For example, the electronic device 101 may determine the scene of the image 1400 as a landscape by using the subsidiary scene determination module 307 of FIG. 3.

Figure 15:
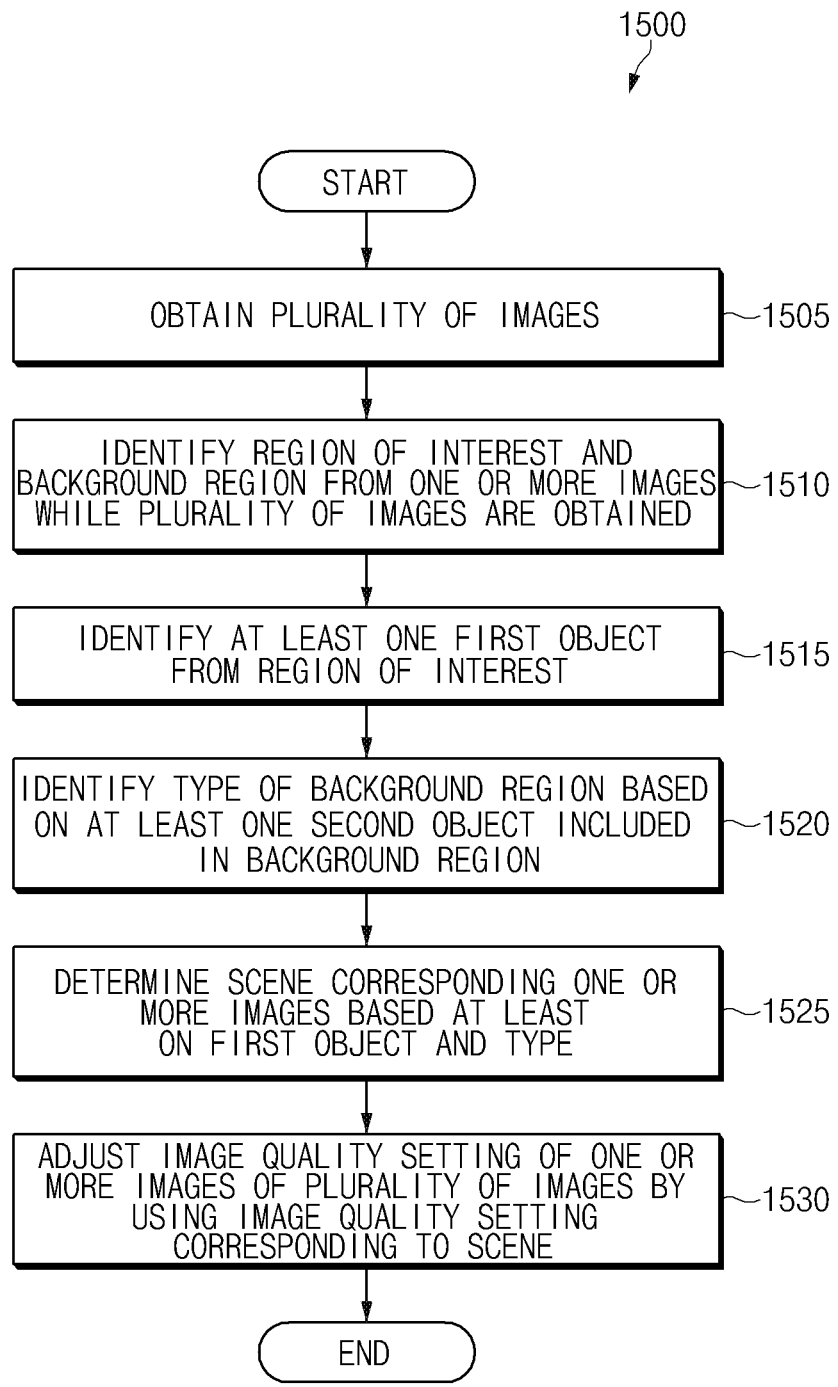
FIG. 15 is a flowchart illustrating a method for adjusting an image quality setting, according to an embodiment.

FIG. 15 is a flowchart 1500 illustrating a method for adjusting an image quality setting, according to an embodiment.

Referring to FIG. 15, the electronic device 101 includes the camera 180, the memory 130, and the processor 120, which is operatively coupled to the camera 180 and the memory 130. For example, the processor 120 may perform the operations of the electronic device 101 described below.

In step 1505, the electronic device 101 (e.g., the processor 120) obtains a plurality of images. For example, the electronic device 101 may obtain a plurality of images for one or more external objects by using the camera 180.

In step 1510, the electronic device 101 identifies a region of interest and a background region by using one or more images of the plurality of images when the similarity between a previous image, which is used to determine the scene before a plurality of images are obtained, and one or more images of the plurality of images is less than a specified range. As another example, the electronic device 101 may generate one or more corrected images, which are obtained by correcting at least some of a plurality of images through a correction scheme set for a previous image, when the similarity between the previous image, which is used to determine the scene before a plurality of images are obtained, and one or more images of the plurality of images is in the specified range.

In step 1510, the electronic device 101 identifies a region of interest and a background region from one or more images while a plurality of images are obtained. For example, the electronic device 101 may identify the region of interest and the background region when scene recognition is determined by the scene recognition determination module 301. For example, the electronic device 101 may identify the background region by using the whole image analyzer 310 and may identify the region of interest by using the object detector 325 of the object image analyzer 320.

In step 1515, the electronic device 101 identifies at least one first object from the region of interest. For example, the electronic device 101 may identify the first object corresponding to the region of interest by using the object identifier 327.

In step 1520, the electronic device 101 identifies the type of the background region based on at least one second object included in the background region. For example, the electronic device 101 may identify the type of the background region by using the whole image analyzer 310.

In step 1525, the electronic device 101 determines a scene corresponding to the one or more images based at least on the first object and the type of the background region. The electronic device 101 may determine a scene based on the reliability of the first object and the type. For example, the electronic device 101 may determine a scene corresponding to one or more images based on the reliability of the type of the background region when the reliability of the first object is less than a specified first value. The electronic device 101 may determine, as a scene corresponding to one or more images, a scene in the upper-level category including at least one type, based on the sum of the reliability of the at least one type corresponding to at least one second object included in the background region, when the reliability of the type is less than the second value.

The electronic device 101 may determine the type of the scene, which is determined based on the reliability of the type, based on at least one of time information or the position information of the electronic device 101. For example, the electronic device 101 may determine the scene using the scene determination module 305 and/or the subsidiary scene determination module 307.

In step 1530, the electronic device 101 adjusts an image quality setting of one or more images of the plurality of images by using the image quality setting corresponding to the scene. For example, the electronic device 101 may adjust the image quality setting corresponding to the scene by using the image quality processing module 309. The electronic device 101 may generate images corresponding to image quality settings adjusted by modifying at least one image quality setting parameter for the plurality of images. The at least one image quality setting parameter may include at least one of brightness, contrast, gamma, hue, sharpness, blur, or a color temperature.

According to an embodiment, the electronic device 101 (e.g., the processor 120 of FIG. 1) may be configured to generate an image corresponding to image quality setting adjusted by adjusting at least one parameter associated with the obtaining of an image by the camera 180. The at least one parameter associated with the obtaining of an image by the camera 180 may include at least one of photosensitivity, a lens diameter, an aperture size, a shutter speed, exposure, focus, hue, a color temperature, or white balance.

The electronic device 101 (e.g., the processor 120 of FIG. 1) may be configured to display, in the form of a preview, an image, which is obtained by using the camera 180 adjusted by using the at least one image quality setting parameter, on the display 160.

According to an embodiment, an electronic device (e.g., the electronic device 101 of FIG. 1) may include a camera (e.g., the camera 180 of FIG. 1), a memory (e.g., the memory 130 of FIG. 1), and a processor (e.g., the processor 120 of FIG. 1)*that* is operatively connected with the camera and the memory. The processor may be configured to obtain a plurality of images for one or more external objects by using the camera, to identify at least one region of interest and at least one background region by using one or more images of the plurality of images, while at least obtaining the plurality of images, to recognize at least one first object, which is included in the region of the interest, of the one or more external objects, to identify a type of the background region by recognizing at least one second object, which is included in the background region, of the one or more external objects, to determine a scene corresponding to the one or more images, based at least on the at least one first object, which is recognized, and the type, and to adjust at least one of an image quality setting associated with the camera or image quality setting associated with the one or more images by using specified image quality setting corresponding to the scene.

The processor may be configured to identify the at least one region of interest and the at least one background region by using the one or more images of the plurality of images, based on that similarity between a previous image, which is used to determine the scene before obtaining the plurality of images, and the one or more images satisfies a specified first range.

The processor may be configured to adjust the at least one of the image quality setting associated with the camera or the image quality setting associated with the one or more images, by using an image quality setting set for the previous image, based on that similarity between the previous image and the one or more images satisfies a specified second range different from the first range.

The processor may be configured to determine the scene corresponding to the one or more images, based on reliability of the at least one first object which is recognized.

The processor may be configured to determine the scene corresponding to the one or more images, based on reliability of the type, when the reliability of the at least one first object which is recognized is less than a first value.

The processor may be configured to determine, when the reliability of the type is less than a specified second value, an upper-level category including at least one type corresponding to the at least one second object included in the background region, based on a sum of reliability of the at least one type, and determine the determined upper-level category as the scene corresponding to the one or more images.

The processor may be configured to determine validity of the scene, which is determined based on the reliability of the type, based on at least one of time information or position information of the electronic device.

The image quality setting associated with the one or more images may include at least one of brightness, contrast, gamma, hue, sharpness, blur, or a color temperature.

The image quality setting associated with the camera may include at least one of photosensitivity, a lens diameter, an aperture size, a shutter speed, exposure, focus, hue, a color temperature, or white balance.

The electronic device may further include a display. For example, the processor may be configured to display, in a preview form, an image, which is obtained by using the camera adjusted by using the image quality setting, on the display.

According to an embodiment, an electronic device (e.g., the electronic device 101 of FIG. 1) may include a display (e.g., the display device 160 of FIG. 1), a camera (e.g., the camera 180 of FIG. 1), a processor (e.g., the processor 120 of FIG. 1) that is operatively connected with the camera and the display, and a memory (e.g., the memory 130 of FIG. 1) that is operatively connected with the processor. The memory may store instructions that when executed, cause the processor to obtain an image, to identify at least one object from a partial region of the obtained image, to identify at least one first tag corresponding to the identified at least one object, to identify at least one second tag corresponding to an entire region of the obtained image, to identify a scene tag corresponding to the obtained image, based on reliabilities of the at least one first tag and the at least one second tag, and to adjust at least one image quality setting parameter, which is associated with obtaining an image, of the camera by using at least one image quality setting parameter corresponding to the scene tag.

The instructions may cause, when executed, the processor to identify the at least one object, the at least one first tag, and the at least one second tag, when similarity between a previous image, which is obtained before the obtained image, and the obtained image is less than a specified range.

The instructions may cause, when executed, the processor to adjust the at least one of an image quality setting parameter, which is associated with obtaining an image, of the camera by using an image quality setting parameter set for the previous image, when the similarity between the previous image and the obtained image is within the specified range.

The instructions may cause, when executed, the processor to identify, as the scene tag, a tag corresponding to one upper-level category in at least one upper-level category, based on a sum of reliabilities of second tags, which belong to the same upper-level category of the at least one upper-level category of the at least one second tag, when reliability of the at least one first tag and reliability of the at least one second tag are less than specified reliability.

The instructions may cause, when executed, the processor to determine validity of the scene tag, based on at least one of time information or position information of the electronic device, and to adjust the at least one image quality setting parameter, which is associated with obtaining the image, of the camera by using the at least one image quality setting parameter corresponding to the scene tag, when the scene tag is determined as being valid.

The instructions may cause, when executed, the processor to identify, when a specified tag of the at least one first tag is present, the scene tag based on the specified tag without identifying the at least one second tag.

The at least one image quality setting parameter, which is associated with obtaining the image, of the camera includes at least one of photosensitivity, a lens diameter, an aperture size, a shutter speed, exposure, focus, hue, a color temperature, or white balance.

The instructions may cause, when executed, the processor to display, in a preview form, an image, which is obtained by using the camera adjusted by using the at least one image quality setting parameter, on the display.

According to an embodiment, a method for setting image quality in an electronic device may include obtaining an image, identifying at least one object from a partial region of the obtained image, identifying at least one first tag corresponding to the identified at least one object, identifying at least one second tag corresponding to an entire region of the obtained image, identifying a scene tag corresponding to the obtained image, based on reliabilities of the at least one first tag and the at least one second tag, and adjusting at least one image quality setting parameter, which is associated with obtaining an image, by using at least one image quality setting parameter corresponding to the scene tag.

The at least one image quality setting parameter, which is associated with obtaining the image, may include at least one of photosensitivity, a lens diameter, an aperture size, a shutter speed, exposure, focus, hue, a color temperature, or white balance.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, m each of such phrases as "A or B," "at least one of A and B," "at least one of A or B," "A, B, or C", "at least one of A, B, and C," and "at least one of A, B, or C," may include all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, according to various embodiments disclosed in the disclosure, a method for adjusting an image quality setting corresponding to the context of an obtained image may be provided.

According to various embodiments disclosed in the disclosure, the power consumption may be reduced by obtaining image setting parameters based on the similarity of images.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera;
a memory; and
a processor operatively connected with the camera and the memory,
wherein the processor is configured to:
obtain, using the camera, a plurality of images for one or more external objects,
identify a region of interest and a background region by using one or more images of the plurality of images, while obtaining the plurality of images,
recognize a first object included in the region of the interest,
identify a type of the background region by recognizing a second object included in the background region,
determine a similarity between a previous image and the one or more images, and
if the similarity is less than a specified value, determine a scene corresponding to the one or more images based on the recognized first object and the identified type of the background region, and adjust at least one of an image quality setting associated with the camera or an image quality setting associated with the one or more images by using a specified image quality setting corresponding to the determined scene.

2. The electronic device of claim 1, wherein the processor is further configured to:
identify the region of interest and the background region by using the one or more images, when the similarity falls within a specified first range,
wherein the previous image is used to determine the scene before obtaining the one or more images.

3. The electronic device of claim 2, wherein the processor is further configured to:
adjust the at least one of the image quality setting associated with the camera or the image quality setting associated with the one or more images, by using an image quality setting set for the previous image, when the similarity between the previous image and the one or more images falls within a specified second range, which is different from the first range.

4. The electronic device of claim 1, wherein the processor is further configured to determine the scene corresponding to the one or more images based on a reliability of the recognized first object.

5. The electronic device of claim 4, wherein the processor is further configured to determine the scene corresponding to the one or more images based on a reliability of the type, when the reliability of the recognized first object is less than a first value.

6. The electronic device of claim 5, wherein the processor is further configured to:
determine, when the reliability of the type is less than a specified second value, an upper-level category including at least one type corresponding to the second object included in the background region, based on a sum of reliability of the at least one type, and
determine the determined upper-level category as the scene corresponding to the one or more images.

7. The electronic device of claim 5, wherein the processor is further configured to determine a validity of the scene, which is determined based on the reliability of the type, based on at least one of time information or position information of the electronic device.

8. The electronic device of claim 1, wherein the image quality setting associated with the one or more images comprises at least one of brightness, contrast, gamma, hue, sharpness, blur, or color temperature.

9. The electronic device of claim 1, wherein the image quality setting associated with the camera comprises at least one of photosensitivity, a lens diameter, an aperture size, a shutter speed, exposure, focus, hue, a color temperature, or white balance.

10. The electronic device of claim 9, further comprising a display,
wherein the processor is further configured to display an image obtained using the camera adjusted with the image quality setting as a preview on the display.

11. An electronic device, comprising:
a camera;
a display;
a processor operatively connected with the camera and the display; and
a memory operatively connected with the processor,
wherein the memory comprises instructions, which when executed, cause the processor to:
obtain an image,
identify an object from a partial region of the obtained image,
identify a first tag corresponding to the identified object,
identify a second tag corresponding to an entire region of the obtained image,
identify a scene tag corresponding to the obtained image based on reliabilities of the first tag and the second tag, and
adjust an image quality setting parameter of the camera using an image quality setting parameter corresponding to the identified scene tag that is based on the reliabilities of the first tag and the second tag,
wherein the instructions, when executed, further cause the processor to identify, as the scene tag, a tag corresponding to one upper-level category in an upper-level category, based on a sum of reliabilities of second tags, which belong to a same upper-level category in the upper-level category of the second tag, when a reliability of the first tag and a reliability of the second tag are less than a specified reliability.

12. The electronic device of claim 11, wherein the instructions, when executed, further cause the processor to identify the object, the first tag, and the second tag, when a similarity between a previous image obtained before the obtained image and the obtained image falls within a specified range.

13. The electronic device of claim 12, wherein the instructions, when executed, further cause the processor to adjust the image quality setting parameter of the camera by using an image quality setting parameter set for the previous image, when the similarity between the previous image and the obtained image falls within the specified range.

14. The electronic device of claim 11, wherein the instructions, when executed, further cause the processor to:
determine a validity of the scene tag, based on time information or position information of the electronic device, and
adjust the image quality setting parameter of the camera by using the image quality setting parameter corresponding to the scene tag, when the scene tag is determined as being valid.

15. The electronic device of claim 11, wherein the instructions, when executed, further cause the processor to identify, when a specified tag is included in the first tag, the scene tag based on the specified tag, without identifying the second tag.

16. The electronic device of claim 11, wherein the image quality setting parameter of the camera comprises at least one of photosensitivity, a lens diameter, an aperture size, a shutter speed, exposure, focus, hue, a color temperature, or white balance.

17. The electronic device of claim 11, wherein the instructions, when executed, further cause the processor to display, on the display, in a preview form, an image obtained using the camera adjusted with the image quality setting parameter.

18. A method for setting image quality in an electronic device, the method comprising:
obtaining an image;
identifying an object from a partial region of the obtained image;
identifying a first tag corresponding to the identified object;
identifying a second tag corresponding to an entire region of the obtained image;
identifying a scene tag corresponding to the obtained image, based on reliabilities of the first tag and the second tag; and
adjusting an image quality setting parameter of a camera of the electronic device by using an image quality setting parameter corresponding to the scene tag that is based on the reliabilities of the first tag and the second tag,
wherein, if the reliabilities of the first tag and the second tag are less than a specified value, a tag corresponding to one upper-level category in an upper-level category is identified as the scene tag based on a sum of reliabilities of second tags, which belong to a same upper-level category in the upper-level category of the second tag.

19. The method of claim 18, wherein the image quality setting parameter of the camera of the electronic device comprises at least one of photosensitivity, a lens diameter, an aperture size, a shutter speed, exposure, focus, hue, a color temperature, or white balance.

* * * * *